June 16, 1953    S. C. WINGER    2,642,081
FLOAT MECHANISM FOR CONTROLLING FLUSH TANK VALVES
Filed May 8, 1951    2 Sheets-Sheet 1

STOVER C. WINGER,
INVENTOR.

BY John Flann
ATTORNEY

June 16, 1953  S. C. WINGER  2,642,081
FLOAT MECHANISM FOR CONTROLLING FLUSH TANK VALVES
Filed May 8, 1951  2 Sheets-Sheet 2

STOVER C. WINGER,
INVENTOR.

BY John Hans
ATTORNEY

Patented June 16, 1953

UNITED STATES PATENT OFFICE 2,642,081

FLOAT MECHANISM FOR CONTROLLING FLUSH TANK VALVES

Stover C. Winger, Los Angeles, Calif., assignor of fifteen per cent to John Flam, Beverly Hills, Calif.

Application May 8, 1951, Serial No. 225,162

10 Claims. (Cl. 137—416)

This invention relates to a float control mechanism for flush tank valves.

This application is a continuation, in part, of an application filed on December 12, 1949, under Ser. No. 132,486, and entitled: Float-Operated Valve Mechanism for Toilet Flush Tanks.

In such tanks, when it is desired to flush the toilet, the water from the tank is discharged substantially completely through the bottom of the tank. An inlet valve near the top of the tank opens when the water level in the tank recedes, and remains open until the water level in the tank attains a desired height. Control of this inlet valve is accomplished usually by a valve-operating arm that carries a float. As the tank discharges, the arm is permitted to descend with the float to open the valve. The egress of water from the tank is ultimately stopped by seating of the flush valve closure on its seat. As the level of the water in the tank rises, the float also rises, and gradually the inlet valve is closed.

This gradual closing of the inlet valve causes inherent difficulties. Although the tank may be only partially filled, the valve begins to close; and, toward the end of the period of rise of the water level, the valve opening is constricted to such an extent that a very small dribble flows. Noisy operation, due to the restricted flow, occurs for a relatively long period before the valve finally closes.

It is one of the objects of this invention to provide a float-operated valve that causes a quick closing at the end of the filling period. In this way, the valve remains fully open during substantially the entire period of operation.

It is another object of this invention to provide a float-operated valve that is quiet and positive in its action.

It is still another object of this invention to provide a float-controlled apparatus that operates to perform a control function in a reliable and positive manner, and promptly upon approach of the level of liquid to a desired height.

The mechanism described in the above-identified application includes a container or casing for the float, the said container being supported by the tank. The water level, as it rises upon filling the tank, ultimately spills over the edge of the container, after which the inlet valve is closed promptly. In such a mechanism the level that the water ultimately reaches is determined by the height of the container. It is, therefore, not practicable in the structure disclosed in said above-entitled application to adjust the level to adapt the mechanism to tanks of varying heights.

It is accordingly another object of this invention to make it possible in a simple manner to adjust the height or level of the water at which the inlet valve is closed.

It is still another object of this invention to provide a simple and inexpensive mechanism of this character, and that has relatively few parts.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings.

Figure 2A:
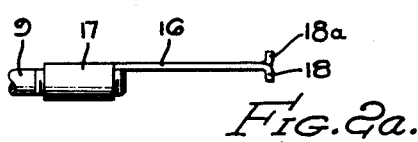
Fig. 2a is a fragmentary plan view of a portion of the apparatus.
Figures 2, 3:
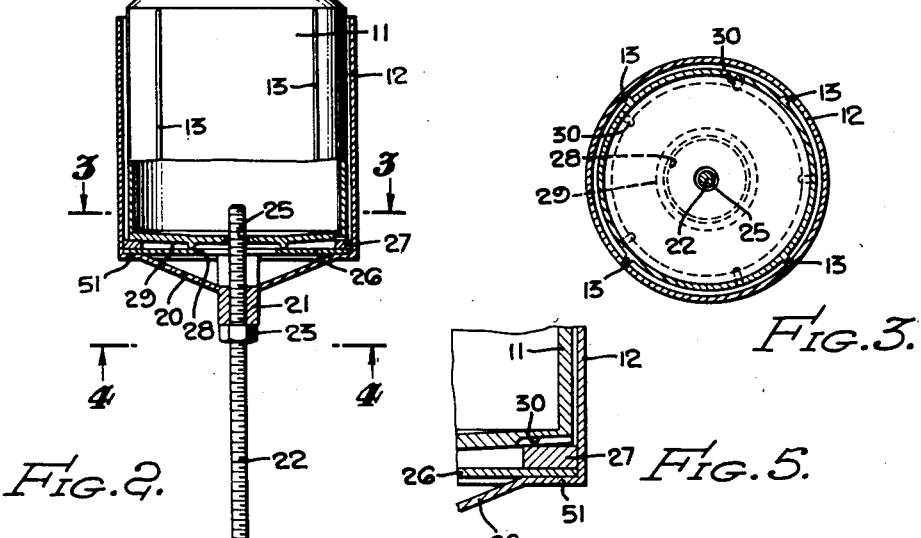
Fig. 2 is an enlarged view, mainly in section, of the valve-operating mechanism illustrated in Fig. 1.
Figure 5:
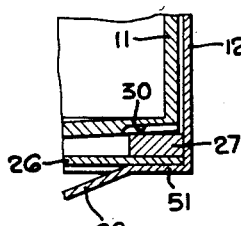
Figure 4:
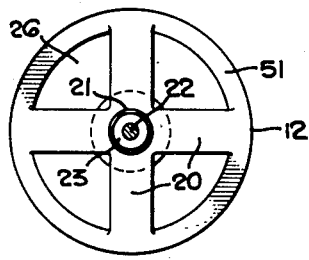
Figure 7:
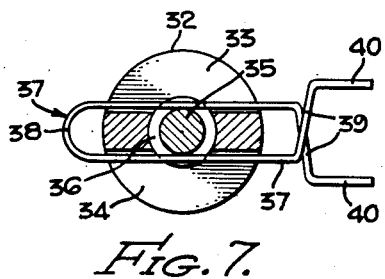
Figure 6:
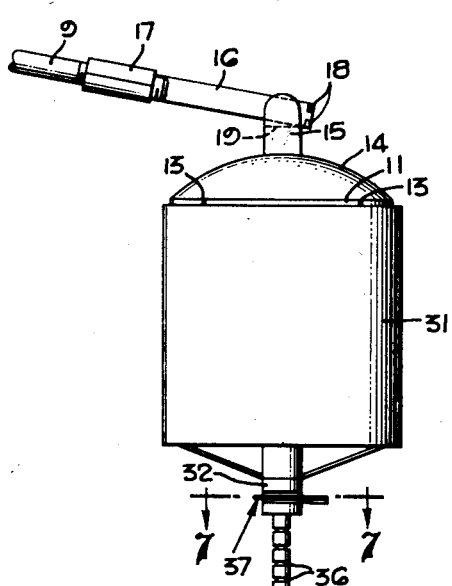
Figure 8:
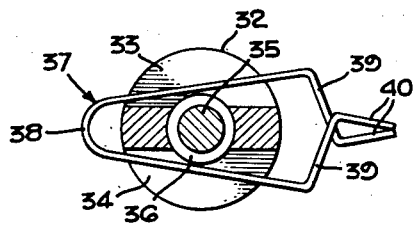
Figure 9:
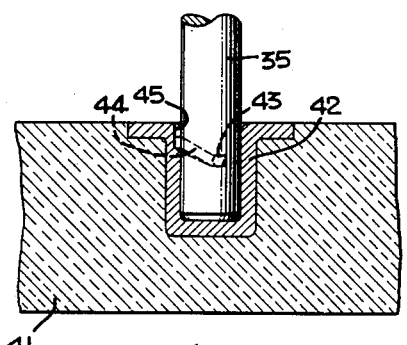

Figs. 3 and 4 are sectional views, taken along a plane corresponding to lines 3—3 and 4—4 of Fig. 2;

Fig. 5 is an enlarged fragmentary section, showing a part of the structure shown in Fig. 2;

Fig. 6 is an elevation of a modified form of apparatus incorporating the invention;

Fig. 7 is an enlarged sectional view, taken along a plane corresponding to line 7—7 of Fig. 6;

Fig. 8 is a view similar to Fig. 7, but illustrating the manner in which adjustment of the height of the float mechanism may be effected; and Fig. 9 is an enlarged fragmentary sectional view, taken along a plane corresponding to line 9—9 of Fig. 6.

In the form of the invention illustrated in Figs. 1 to 5, inclusive, a flush tank 1 is illustrated having a bottom wall 2. This bottom wall is provided with the usual flushing outlet 3 controlled by a flush valve including a closure member 4.

As is well understood, when it is desired to flush the tank 1, the closure member 4 is raised and the water 5 in the tank is rapidly discharged through the outlet conduit 6.

Figure 1:
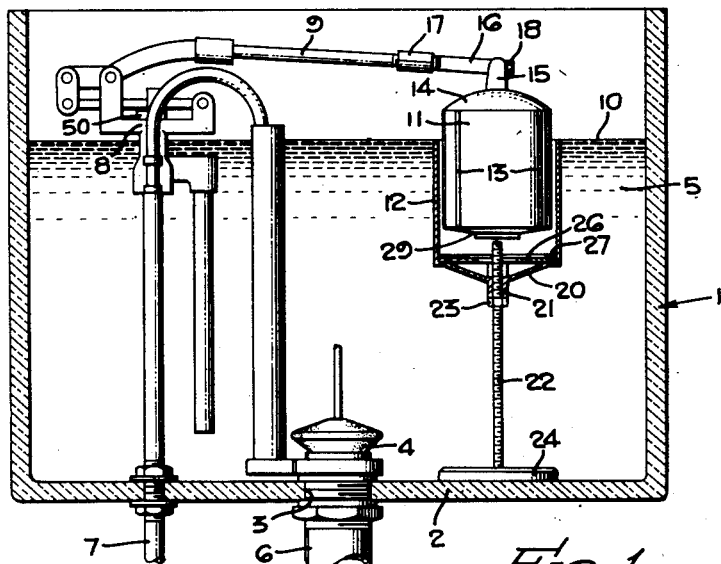
Figure 1 is a view illustrating a mechanism incorporating the invention, installed in a flush tank, the tank being in section.

A conventional inlet valve structure for filling the tank 1 when it is flushed is illustrated at the left-hand portion of Fig. 1. This includes an inlet pipe 7 controlled by an inlet valve mechanism 8. The closure 50 for the valve mechanism is controlled by an arm 9 which, in the conventional form of inlet valve mechanism, is operated by a float. Thus, when the level 10 of the liquid 5 reaches a definite point, the float moves the arm 9 upwardly and causes the inlet valve 8 to close. Since this mechanism is well known, further description thereof is unnecessary.

In the present instance, the arrangement is such that the inlet valve 8 is maintained open until the level 10 of the liquid (Fig. 1) reaches the desired value. Upon attainment of this level, the arm 9 is rapidly moved upwardly to close the valve 8.

A buoyant member 11, of generally cylindrical form, is disposed in a casing 12. Both the members 11 and 12 are preferably made from mold plastic material, such as polyethylene, that is not affected by moisture. Buoyant member 11, as shown most clearly in Fig. 3, may be provided with a series of vertical ribs 13 that serve as guides for the vertical movement of the buoyant member 11 within the casing 12. This buoyant member 11 is arranged to be floated to the position of Fig. 1 when the desired liquid level is attained. This buoyant member 11 is in the form of a bell in which air may be trapped and slightly compressed upon the rise of liquid, thus providing buoyancy therefor. Accordingly, there is an opening 25 in the bottom wall of the member 11. This bottom wall may be slightly sloping.

At its upper end, the member 11 has a domed upper wall 14 to which is attached a clevis 15. This clevis 15 serves as a guide for the extension 16 of the rod 9 (Figs. 2 and 2a). This extension 16 is formed of a flat piece of metal, the left-hand end of which is rolled to form a cylindrical portion 17 threaded for the accommodation of the threaded end of rod 9. At its right-hand end, the extension 16 is provided with two bent portions or ears 18, respectively at the opposite edges of extension 16, and a central, oppositely bent portion 18a (Fig. 2a) adapted to engage the ears forming the clevis 15.

When the liquid level is lowered during the process of flushing, the arm 9, by gravity, moves downwardly and stays in contact with the surface 19 (Fig. 2) disposed between the ears of the clevis 15. The buoyant member 11 is caused to rise only after the attainment of the liquid level 10 in the tank 1. At that time, this surface 19, being in engagement with the extension 16, urges the arm 9 upwardly to close the inlet valve. The manner in which the float or buoyant member 11 is caused to rise only after this level is attained will be described hereinafter.

The casing 12 is open at its bottom end, and is provided with the arms 20 (Fig. 4) joined to a central hub 21. This central hub is threaded on the threads formed on a vertical supporting rod 22. A jam nut 23 holds the casing 12 in adjusted vertical position.

The lower end of the rod 22 is threaded into a weight 24 that is disposed on the bottom wall 2 of the tank 1. This weight, together with member 11, maintains the casing 12 in proper vertical position.

The clearance aperture 25 (Fig. 3) permits the post or supporting rod 22 to pass into the buoyant member 11. In this way, vertical adjustment of casing 12 is permitted even when the casing is lowered on the rod 22 by a substantial amount.

At the lower end of casing 12 there is a flat flange 51 (Figs. 2, 4 and 5) that defines a large opening. This flange accommodates an apertured diaphragm 26. This diaphragm is held in place by a ring 27 tightly telescoping within the casing 12. The ring 27 and diaphragm 26 are also appropriately made of a plastic material, such as polyethylene, which is unaffected by water. The diaphragm 26 is thin enough to be flexible. The aperture 28 in this diaphragm is closed by the closure member 29, having an annular configuration and contacting the upper surface of the diaphragm 26 when the buoyant member 11 is in the lowered position of Fig. 2. When in this position, the aperture 28 is closed, and no water can enter the casing 12 through it. The water level, when it reaches the diaphragm 26, urges this diaphragm against the closure 29, thereby producing a check valve effect.

The ring 27 serves as a limit to the downward movement of the buoyant member 11 with respect to the casing 12. Furthermore, in the lower edge of the buoyant member 11, notches 30 are disposed (Fig. 5). These notches serve to establish communication from the annular space between the casing 12 and the member 11 to the space below the buoyant member 11.

The mode of operation of this mechanism is similar to that disclosed in said prior application. When the tank 1 is filled to the level 10, as indicated in Fig. 1, the member 11 floats and holds the arm 9 in valve-closing position. As soon as the closure member 4 for flushing the tank is lifted, the water level recedes, and the water from casing 12 is discharged through the diaphragm 26. In the lowered position of the buoyant member 11, the threaded support 22 can extend upwardly into the buoyant member 11, as shown most clearly in Fig. 2.

As the buoyant member 11 moves downwardly, the arm 9 also moves downwardly by gravity, and the inlet valve 8 is opened. When the tank 1 empties as shown in Fig. 2, the inlet valve 8 admits water into the tank 1. As the water rises and reaches the diaphragm 26, this diaphragm is urged against the annular closure 29 so that no water can enter the casing 12 from below. However, as soon as the level 10 reaches the upper edge of the casing 12, the water spills over and into the narrow space between the buoyant member 11 and the casing 12. The buoyant member 11 rises promptly, because only a very little volume of water is needed to float the member 11. Just as soon as it rises, the aperture 28 in the diaphragm 26 is opened. Accordingly, the water may rise through this aperture until the valve 8 is closed. This corresponds to the position of Fig. 1.

When the water level recedes upon flushing, and the buoyant member 11 rests upon the ring 27, any water remaining in the casing 12 may pass out by gravity through the notches 30 and past the closure member 29. In this way, it is assured that the casing 12 will be completely emptied for each operation.

In the form of the invention illustrated in Figs. 6, 7, 8, and 9, the buoyant member 11 and the extension 16 and arm 9 are arranged as before. The casing 31, in this instance, is adjustably supported on an upright rod 35. This rod is provided with a series of vertically spaced annular grooves 36. The hub 32 of the casing 31 is provided with diametrically opposite slots 33, 34. A spring member 37 has legs accommodated in the slots 33 and 34, said legs being joined by the loop 38. These legs engage in any one of the grooves 36, and maintain the casing 31 in a definite vertical position with respect to support 35.

The free ends 39 of the spring member 37 are crossed to provide finger grips 40. When the finger grips 40 are brought together, as indicated in Fig. 7, by the fingers of any person, then the spring disengages from the groove 36 and the casing 31 may be moved upwardly or downwardly to adjust the vertical position of the casing 31. Then the grips 40 may be released to cause them to engage in another annular groove 36, as indicated in Fig. 7.

The lower end of the supporting rod 35 may be attached directly to the bottom wall 41 of the flush tank. As shown most clearly in Fig. 9, a metal thimble 42 is provided for the accommodation of the bottom of the rod 35. This rod 35 is provided with a pin 43 engaging a helical groove 44 in the inner wall of the thimble 42. Accordingly, to fix the bottom of the rod 35 within the thimble 42, the pin 43 is first dropped into the vertical portion 45 of the slot 44, and then the rod 35 may be turned so as to cause the pin 43 to travel downwardly in the slot 44.

In the first form described, the threaded rod support 22 serves to provide adjustment for the casing 12. Similarly, the annular grooves 36 of the form shown in Fig. 6 accomplish the same result. In this way, the apparatus can be operated in tanks of different dimensions for causing the level of the liquid to reach a desired predetermined height.

The inventor claims:

1. In a float mechanism for controlling an inlet valve for a tank: a hollow buoyant operating member having an opening in its lower wall; a casing having an aperture in the bottom, the member being in the casing; a vertical support for the casing adjustably mounted on said casing, said casing and said support being so related that in some adjusted positions the support extends through the bottom of the casing and into the opening in the buoyant member; and means preventing ingress of liquid through the bottom of the casing when the member is in its lowered position.

2. In a float mechanism for controlling an inlet valve for a tank: a hollow buoyant operating member having an opening in its lower wall; a casing having an aperture in the bottom, the member being in the casing; a vertical support for the casing; a flexible apertured diaphragm fixed to the bottom of the casing; and a closure member carried by the lower end of the member for cooperating with the diaphragm for closing the diaphragm aperture.

3. In a float mechanism for controlling an inlet valve for a tank: a hollow buoyant operating member having an opening in its lower wall; a casing having an aperture in the bottom, the member being in the casing; a vertical support for the casing adjustably mounted on said casing, said casing and said support being so related that in some adjusted positions the support extends through the bottom of the casing and into the opening in the buoyant member; means preventing ingress of liquid through the bottom of the casing when the member is in its lowered position; and means for securing the casing on the support in an adjusted position.

4. In a float mechanism for controlling an inlet valve for a tank: a hollow buoyant operating member having an opening in its lower wall; a casing having an aperture in the bottom, the member being in the casing; a vertical support for the casing; a flexible apertured diaphragm fixed to the bottom of the casing; a closure member carried by the lower end of the member for cooperating with the diaphragm for closing the diaphragm aperture; and means for adjusting the vertical position of the casing on the support.

5. In a float mechanism for controlling an inlet valve for a tank: a hollow buoyant operating member having an opening in its lower wall; a casing having an aperture in the bottom, the member being in the casing; a threaded rod supporting the casing adjustably mounted on said casing, said casing and said rod being so related that in some adjusted positions the rod extends through the bottom of the casing and into the opening in the buoyant member; and means for preventing ingress of liquid through the aperture when the member is in its lowered position.

6. In a float mechanism for controlling an inlet valve for a tank: a hollow buoyant operating member having an opening in its lower wall; a casing having an aperture in the bottom, the member being in the casing; a threaded rod supporting the casing; a flexible apertured diaphragm fixed to the bottom of the casing; and a closure member carried by the lower end of the member for closing the diaphragm aperture.

7. In a float mechanism for controlling an inlet valve for a tank: a hollow buoyant operating member having an opening in its lower wall; a casing having an aperture in the bottom, the member being in the casing; a rod having a series of vertically spaced grooves; means carried by the casing cooperating with any one of the grooves for adjustably supporting the casing on the rod; said casing and said rod being so related that in some adjusted positions the rod extends through the bottom of the casing and into the opening of said buoyant operating member; and means for preventing ingress of liquid through the aperture when the member is in lowered position.

8. In a float mechanism for controlling an inlet valve for a tank: a hollow buoyant operating member having an opening in its lower wall; a casing having an aperture in the bottom, the member being in the casing; a rod having a series of vertically spaced grooves; means carried by the casing cooperating with any one of the grooves for adjustably supporting the casing on the rod; a flexible apertured diaphragm fixed to the bottom of the casing; and a closure member carried by the lower end of the member for closing the diaphragm aperture.

9. In a float mechanism for controlling an inlet valve for a tank; a hollow buoyant operating member having an opening in its lower wall; a casing having an aperture in the bottom, the member being in the casing; a vertical support for the casing; a flexible apertured diaphragm fixed to the bottom of the casing; a closure member carried by the lower end of the member for cooperating with the diaphragm for closing the diaphragm aperture; and means carried by the casing for limiting the movement of the member inwardly of the casing.

10. In a float mechanism for controlling an inlet valve for a tank: a hollow buoyant operating member having an opening in its lower wall; a casing having an aperture in the bottom, the member being in the casing; a threaded rod supporting the casing; a flexible apertured diaphragm fixed to the bottom of the casing; and a closure member carried by the lower end of the member for closing the diaphragm aperture.

STOVER C. WINGER.

References Cited in the file of this patent

UNITED STATES PATENTS

| Number | Name | Date |
| --- | --- | --- |
| 1,037,679 | Snyder | Sept. 3, 1912 |
| 1,084,267 | Gleeson | Jan. 13, 1914 |
| 1,943,569 | Warner | Jan. 16, 1934 |
| 2,040,272 | Ricard | May 12, 1936 |